United States Patent
Petrich et al.

(10) Patent No.: US 7,725,220 B2
(45) Date of Patent: May 25, 2010

(54) ADAPTIVE FILTERING FOR ALTIMETERS

(75) Inventors: Curtis J. Petrich, Minneapolis, MN (US); David V. Hansen, Eden Prairie, MN (US)

(73) Assignee: Honeywell International Inc., Morristown, NJ (US)

(*) Notice: Subject to any disclaimer, the term of this patent is extended or adjusted under 35 U.S.C. 154(b) by 942 days.

(21) Appl. No.: 11/466,819

(22) Filed: Aug. 24, 2006

(65) Prior Publication Data

US 2008/0051948 A1 Feb. 28, 2008

(51) Int. Cl.
*G01C 23/00* (2006.01)

(52) U.S. Cl. ............................ 701/4; 701/10

(58) Field of Classification Search ............ 701/3, 701/4, 14, 15, 18, 1, 10; 342/26 R, 26 B, 342/120, 118, 175, 195, 196, 173, 174, 165
See application file for complete search history.

(56) References Cited

U.S. PATENT DOCUMENTS

| 4,698,635 A | * | 10/1987 | Hilton et al. | ............... 342/64 |
| 4,996,533 A | * | 2/1991 | May et al. | ............... 342/108 |
| 7,095,364 B1 | * | 8/2006 | Rawdon et al. | ............. 342/120 |

* cited by examiner

*Primary Examiner*—Richard M. Camby
(74) *Attorney, Agent, or Firm*—Fogg & Powers LLC

(57) ABSTRACT

A method of processing altitude measurements for an aircraft is disclosed. The method involves filtering raw altimeter data within an altimeter to substantially limit random variations in the altitude measurements for one or more altimeter measurement profiles.

20 Claims, 2 Drawing Sheets

ADAPTIVE FILTERING FOR ALTIMETERS

BACKGROUND

Reliable navigation systems have always been essential for estimating position during flight. For example, traditional altimeter measurements determine the altitude of an aircraft above a fixed level by measuring air pressure (where air pressure decreases with an increase of altitude). A radar altimeter measures altitude by using the time for a radio signal to reflect from a surface (terrain) back to the aircraft. For example, the radar altimeter measures exact height during landing and when the aircraft (in particular, a rotary-wing aircraft) is in a hover mode. Radar altimeters are typically included as a component in various on-board avionics systems. In each on-board avionics system, the radar altimeter component informs an operator (pilot) that the aircraft is flying too low or that terrain is rising to meet the aircraft.

Traditionally, accepting a certain level of altimeter sensor noise is accommodated for when measuring altitude in conditions similar to those described above. As the complexity of aircraft operations (missions) increase, reducing this noise (jitter) becomes significant for ensuring a high level of measurement reliability. Traditional filtering methods that stabilize altitude measurements mainly rely on post-processed data. This post-processed data may not be responsive to rapid changes or random variations in the aircraft's altitude. Additionally, current filtering methods are generally not reflective of terrain conditions, mission status, and other operating modes where minimal noise levels are essential for proper altitude measurement processing.

SUMMARY

The following specification addresses adaptive filtering in altimeters that selectively compensates for sensor measurement noise based on a current altitude. Particularly, in one embodiment, a method of processing altitude measurements for an aircraft is provided. The method involves filtering raw altimeter data within an altimeter to substantially limit random variations in the altitude measurements for one or more altimeter measurement profiles.

DRAWINGS

These and other features, aspects, and advantages will become better understood with regard to the following description, appended claims, and accompanying drawings where:

Like reference numbers and designations in the various drawings indicate like elements.

DETAILED DESCRIPTION

The following detailed description discusses at least one embodiment for adaptive filtering in altimeters that selectively compensates for sensor measurement noise based on a current altitude. Advantageously, the adaptive filtering responds to one or more filter mode selections provided by an external avionics system (or operator). The adaptive filtering provides stable (that is, smooth) altitude measurements to one or more aircraft flight controls based on raw (unfiltered) altitude data. The one or more filter mode selections allow the external avionics system to respond to changes in average altitude depending on a current operating mode (for example, when a rotary-wing aircraft is hovering, the stable altitude measurements are critical for a successful mission). Performing the adaptive filtering immediately within the altimeter improves (decreases) response time for the one or more aircraft flight controls with respect to abrupt changes in altitude.

Figure 1:
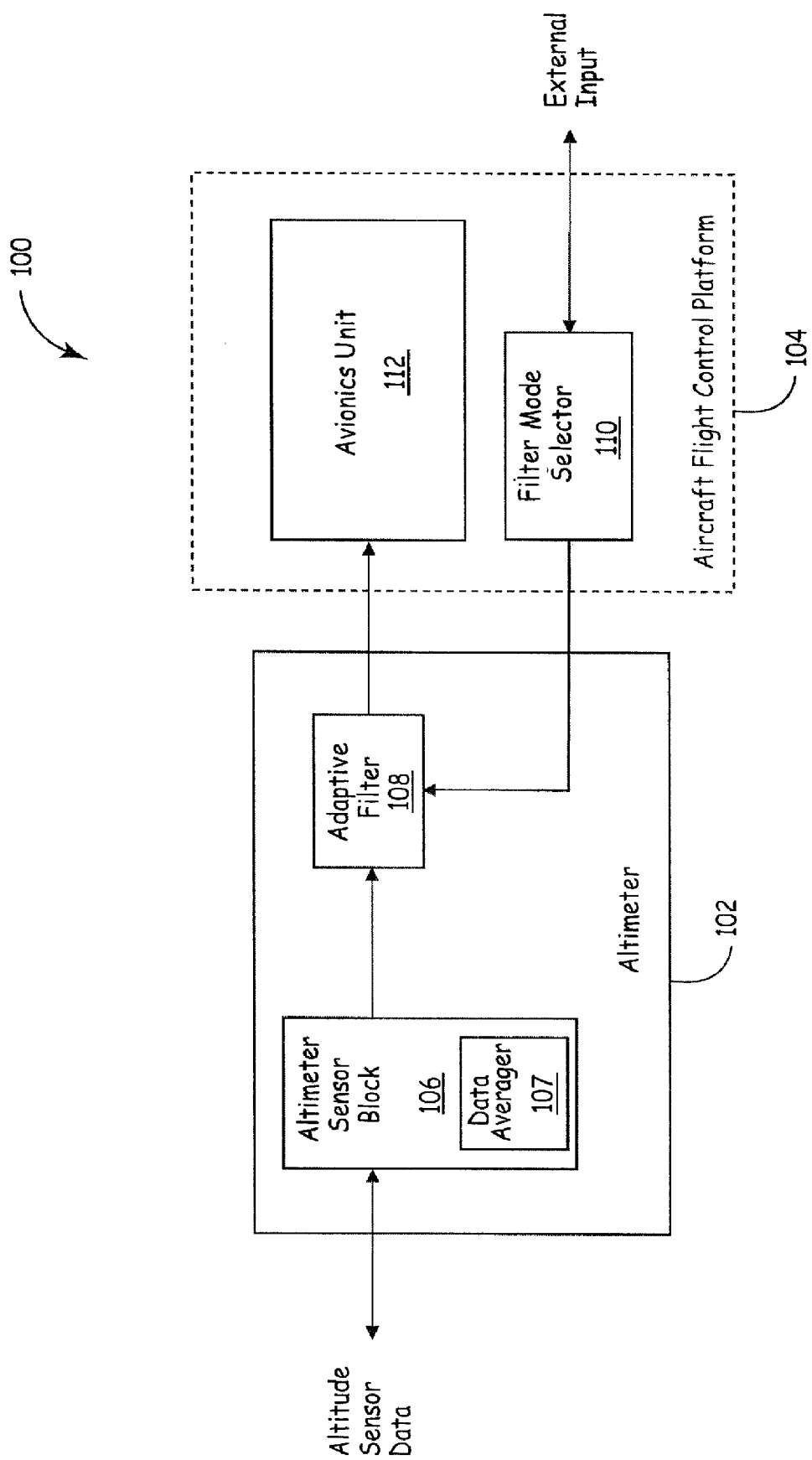
FIG. 1 is a block diagram of an embodiment of an avionics system.

FIG. 1 is a block diagram of an embodiment of an avionics system 100. The avionics system 100 comprises at least one altimeter 102 in communication with an aircraft flight control platform 104. In the example embodiment of FIG. 1, the at least one altimeter 102 and the aircraft flight control platform 104 are separate system components within the avionics system 100. In alternate implementations, the at least one altimeter 102 and the aircraft flight control platform 104 comprise a single system component. The at least one altimeter 102 further comprises an altimeter sensor block 106 coupled to an adaptive filter 108. The aircraft flight control platform 104 further comprises a filter mode selector 110 and an avionics unit 112. The filter mode selector 110 receives at least one mode selection from an external input (for example, a pilot or autopilot response). The filter mode selector 110 sends the at least one mode selection to the adaptive filter 108 as further illustrated in FIG. 1. The adaptive filter 108 responds to the at least one mode selection by updating the avionics unit 112 with filtered altitude measurement data as further described in detail below.

In operation, the altimeter 102 receives continuous raw altitude sensor data (recorded by one or more altitude sensors) in the altimeter sensor block 106. The data averager 107 computes a streaming average altitude value from the raw altitude sensor data. The altimeter sensor block 106 outputs the streaming average altitude value to an input of the adaptive filter 108. Once the filter mode selector 110 receives a current operating mode instruction, the filter mode selector 110 configures the adaptive filter 108 to vary one or more filter coefficients (within the adaptive filter 108). In one implementation, the one or more filter coefficients comprise one or more time constants that filter sensor measurement noise from the streaming average altitude value based on the current operating mode. The adaptive filter 108 outputs the raw filtered altimeter data (that is, the streaming average altitude value) as uniform (that is, smooth and noise-free) altitude measurement data to the avionics unit 112. The avionics unit 112 associates the filtered altimeter data with one or more aircraft flight controls to substantially limit any random variations in the (now-filtered) streaming average altitude value. In one implementation, the one or more aircraft flight controls (not shown) are updated to adjust an existing flight pattern based on the uniform altitude measurement data from the adaptive filter 108.

Figure 2:
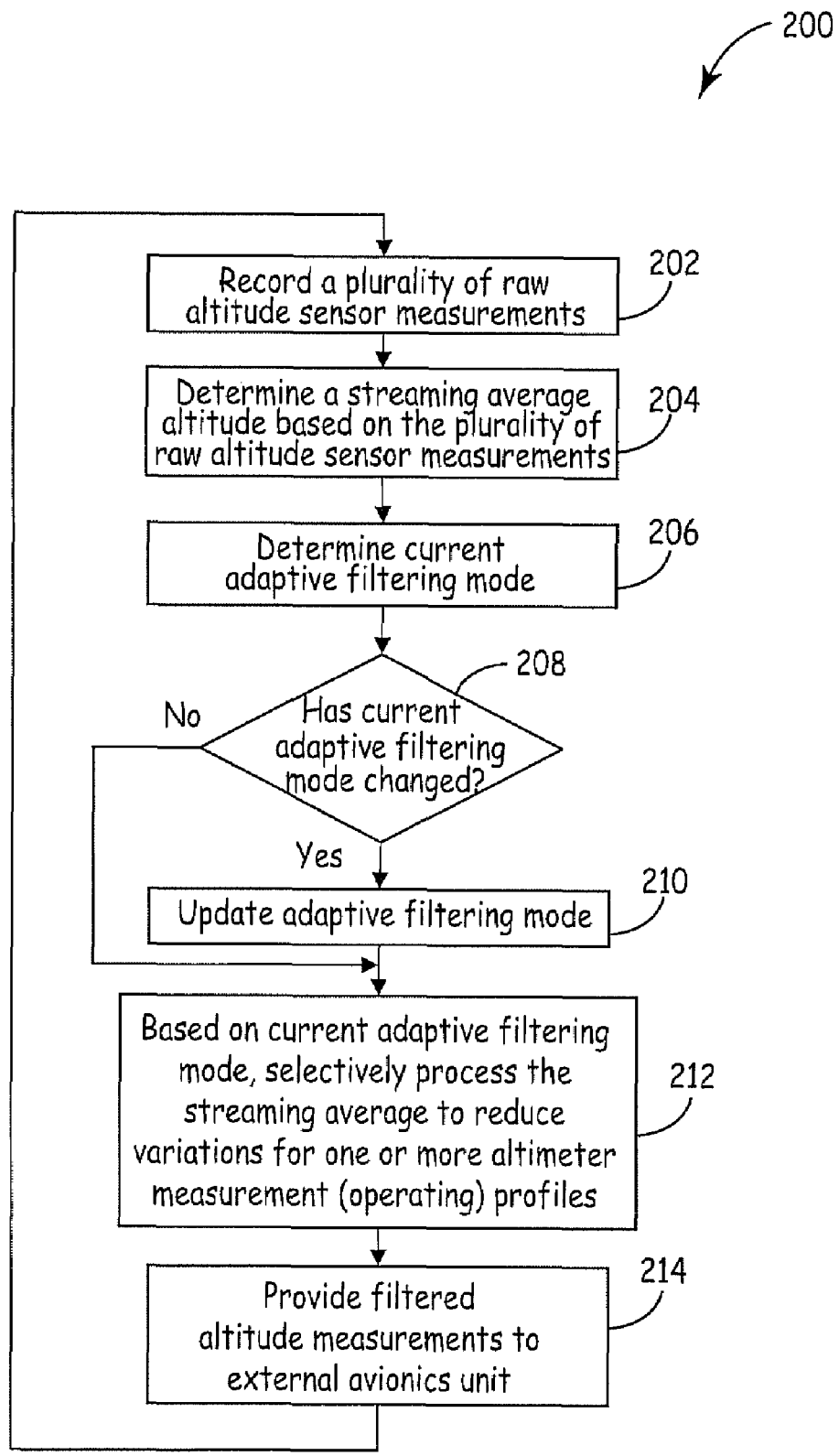
FIG. 2 is a flow diagram illustrating an embodiment of a method for filtering altimeter data within the avionics system of FIG. 1.

FIG. 2 is a flow diagram illustrating an embodiment of a method 200 for filtering altimeter data within the avionics system 100. In the example embodiment of FIG. 2, once the altimeter sensor block 106 records a plurality of raw altitude sensor measurements at block 202, the method 200 determines a streaming average altitude based on the plurality of raw altitude sensor measurements at block 204. A primary function of the method 200 of FIG. 2 is to stabilize the streaming average altitude value to reduce periodic deviations in altitude measurements by the altimeter 102 for one or more altimeter measurement profiles under the guidance of the aircraft flight control platform 104. In one implementation, the one or more altimeter measurements profiles include, without limitation, a hover mode profile, a load-bearing (sling-operating) profile, a low altitude profile, an even terrain (for example, over water) profile, and a rough terrain (for example, over mountainous regions) profile.

At block 206, the filter mode selector 110 selects a current adaptive filtering mode for the adaptive filter 108 based on user input. If the current operating mode has changed (block 208) from a previous state (or the mode is fixed), the current adaptive filtering mode is updated for the adaptive filter 108 at block 210. At block 212, the current adaptive filtering mode selectively processes the streaming average altitude value to reduce (that is, substantially limit) the periodic deviations for the one or more altimeter measurement profiles under the guidance of the aircraft flight control platform 104. At block 214, the selectively processed (that is, filtered) average is received by the avionics unit 112 before the method 200 begins another sequence.

This description has been presented for purposes of illustration, and is not intended to be exhaustive or limited to the form (or forms) disclosed. Variations and modifications may occur, which fall within the scope of the embodiments described above, as set forth in the following claims.

What is claimed is:

1. A method of processing altitude measurements for an aircraft, the method comprising:
   receiving raw altitude sensor data;
   determining a streaming average of the raw altitude sensor data; and
   adaptively filtering the streaming average of the raw altitude sensor data within an altimeter to substantially limit random variations in the altitude measurements for one or more altimeter measurement profiles.

2. The method of claim 1, wherein the streaming average of the raw altitude sensor data is determined by averaging the raw altitude sensor data recorded by one or more altitude sensors.

3. The method of claim 1, wherein filtering the streaming average of the raw altitude sensor data further comprises updating one or more aircraft flight controls with uniform altitude measurement data.

4. The method of claim 3, wherein updating the one or more aircraft flight controls with uniform altitude measurement data comprises instructing an adaptive altimeter filter to vary one or more filter coefficients based on the one or more altimeter measurement profiles.

5. The method of claim 4, wherein instructing the adaptive altimeter filter further comprises adjusting an existing flight pattern based on the uniform altitude measurement data.

6. A method for filtering altimeter data, the method comprising:
   determining a streaming average of the altimeter data;
   adaptively filtering the streaming average of the altimeter data by selectively processing the streaming average within an altimeter based on an adaptive filtering mode; and
   from the processed average, stabilizing the altimeter data to reduce periodic deviations in altitude measurements for one or more altimeter measurement profiles.

7. The method of claim 6, wherein determining the streaming average comprises recording a plurality of raw altitude sensor measurements.

8. The method of claim 6, wherein selectively processing the streaming average further comprises varying one or more filter coefficients as a function of altitude.

9. The method of claim 8, wherein varying the one or more filter coefficients further comprises evaluating at least one time constant based on the adaptive filtering mode.

10. The method of claim 6, wherein stabilizing the altimeter data further comprises:
    selecting a current altimeter measurement profile from the one or more altimeter measurement profiles; and
    updating the adaptive filtering mode based on the selected altimeter measurement profile.

11. An avionics system, comprising:
    at least one altimeter, including:
      an altimeter sensor block that receives raw altitude sensor data, and
      an adaptive filter coupled with the altimeter sensor block, the adaptive filter responsive to random variations in the raw altitude sensor data; and an aircraft flight control platform, including:
    an avionics unit responsive to the adaptive filter of the at least one altimeter, and
    a filter mode selector in communication with the adaptive filter, the filter mode selector responsive to an external input that instructs the adaptive filter to selectively compensate for periodic deviations in altitude measurements based on one or more altimeter measurement profiles.

12. The system of claim 11, wherein the avionics system resides in a rotary wing aircraft.

13. The system of claim 11, wherein the altimeter sensor block further includes a data averager.

14. The system of claim 13, wherein the data averager provides an average of the raw altimeter sensor data to the adaptive filter.

15. The system of claim 11, wherein the at least one altimeter is a radar altimeter.

16. The system of claim 11, wherein the adaptive filter further comprises one or more time constants selected to reduce the random variations in the raw altitude sensor data based on an instruction received from the filter mode selector.

17. The system of claim 11, wherein the one or more altimeter measurement profiles are responsive to a current altitude of an aircraft.

18. The system of claim 11, wherein the one or more altimeter measurement profiles comprise one of a hover mode profile, a load-bearing profile, a low altitude profile, an even terrain profile, and a rough terrain profile.

19. The system of claim 11, wherein the aircraft flight control platform is external to the at least one altimeter.

20. The system of claim 11, wherein the avionics unit and the filter mode selector reside on a single electronics module within the aircraft flight control platform.

* * * * *